April 27, 1937.  F. A. LUTHY  2,078,394

PISTON RING

Filed April 10, 1936

Inventor
Fredrick A. Luthy

By Beaman & Langford
Attorney

Patented Apr. 27, 1937

2,078,394

UNITED STATES PATENT OFFICE 2,078,394

PISTON RING

Fredrick A. Luthy, Jackson, Mich.

Application April 10, 1936, Serial No. 73,631

1 Claim. (Cl. 309—45)

The present invention relates to improvements in piston rings for internal combustion engines and the like and has particular reference to a split oil ring employing an inner expander spring.

Heretofore in commercial practice it has been known to insert an irregular shaped expander spring between the oil ring and the bottom of the ring groove in the piston. In such constructions the oil ring has been provided with radially extending ports spaced circumferentially of the ring through which oil is adapted to flow and ports are provided in the vertical wall of the groove opening into the interior of the piston. In order to assure the passage of oil through the ports in the ring and those of the groove past the imposed spring, notches and apertures have been provided in the spring, which is usually of flat wire stock. The employment of these notches and apertures not only lessens the tension of the expander spring but tend to apply an off-center thrust upon the oil ring which cocks or tilts the same in its groove greatly impairing the efficiency thereof.

It becomes an object of the present invention to provide a piston ring of a construction which will maintain the expander spring in a centered position and the ring at all times will be under a uniform radially directed thrust without any tendency of cocking or tilting in the ring groove.

Another object is to provide an oil ring having radially extending ports circumferentially spaced in which the ring construction defining the ports is such as to eliminate clogging due to particles of foreign carbon and other matter in the oil and the ports are substantially self-cleaning.

Another object of the invention is to provide an oil ring and inner expander spring assembly of a construction which results in the expander spring and ring being maintained in a definite relationship within the ring groove and clearances are provided and maintained between the spring and groove which provide adequate passage for the flow of oil between the ports of the ring and the ports of the groove without modifying the spring construction in any manner such as by providing notches or apertures therein.

A further object is to provide an oil ring and inner expander spring assembly in which provision is made for maintaining during operation adequate passage for flow of oil radially and circumferentially of the ring groove.

Figure 1:
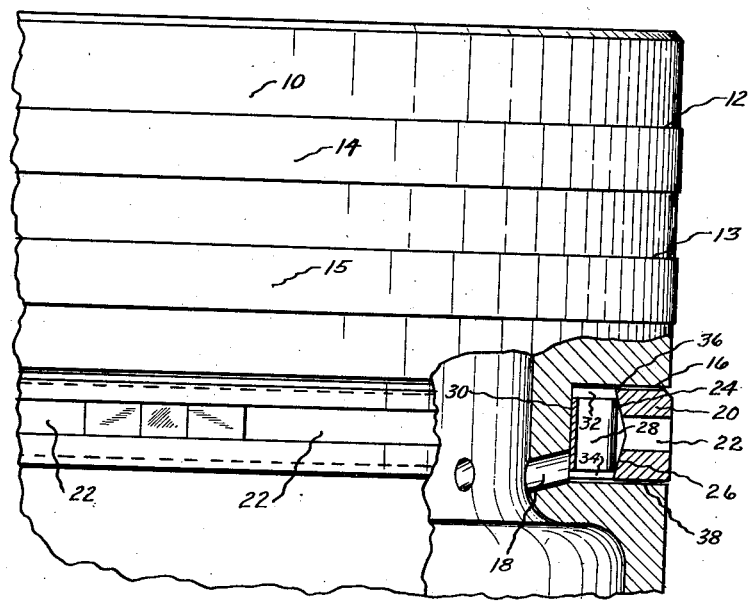
Figure 2:
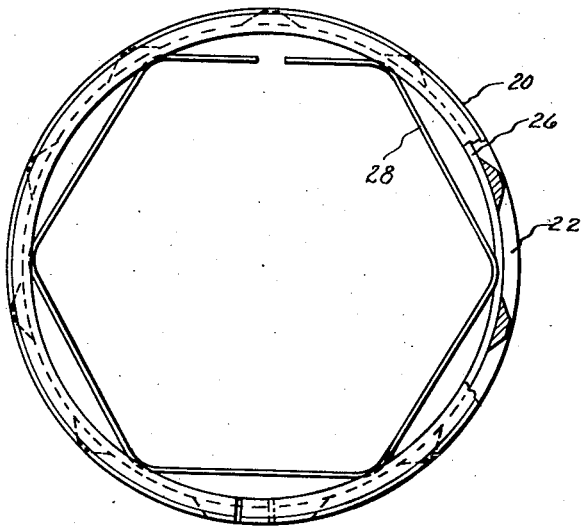

These and other objects residing in the specific details of construction will become apparent upon the consideration of the following detailed description when considered in connection with the accompanying drawing wherein, Fig. 1 is a fragmentary side elevational view of a piston partly shown in cross-section showing the improved oil ring in position, and Fig. 2 is a plan view showing the parts of the improved oil ring in assembled relation.

The piston 10 is shown with conventional compression ring grooves 12 and 13 having compression rings 14 and 15 therein and an oil ring groove 16 into which passages 18 open through the walls of the piston for removal of oil from the oil groove 16 through the interior of the piston in a well known manner. As shown my improved oil ring comprises an outer ring 20 having circumferentially spaced openings 22 for the removal of oil from the cylinder wall. The inner surface of the ring 20 is recessed providing a pair of converging conical seats 24 and 26 extending circumferentially of the ring 20.

An expander spring 28 of wire stock and of well known configuration is inserted between the wall 30 of the groove 16 and the ring 20 and engages at vertically spaced points its outer periphery with the conical seats 24 and 26. The spring 28 which is preferably of considerably less width than the ring 20 is centrally maintained within the groove 16 by the inclination of the converging seats 24 and 26. With the spring thus centrally positioned within the groove 16 circumferentially extending oil passages 32 and 34 are defined between the spring 28 and the upper and lower walls 36 and 38 of the groove 16. The oil removed through the openings 22 may circulate circumferentially of the piston through the passages 32 and 34 before being discharged through the passages 18. This arrangement overcomes any tendency for a particular arc of the oil ring being unable to remove an unusual amount of oil from an area of the piston wall receiving an excessive amount of oil as the oil being removed is freely distributed circumferentially of the oil groove and need not be entirely removed through the passages 18 directly opposite such area. Another decided advantage resulting from centrally locating the expander spring resides in uniform radial expander action upon the outer ring 20 and any tendency for "cocking" and irregular wear that might result from an off-center application of action is eliminated. Moreover, with a narrow centrally maintained expander spring no apertures, notches, or the like, need be provided in the spring for avoiding objectionable restriction of oil flow.

In addition to the centering action of the recessed inner surface of the ring 20, another decided advantage of construction is obtained, namely, the openings 22 are less likely to become clogged with foreign matter than in an oil ring of conventional construction in which the inner and outer faces are parallel. This characteristic is attributed to the decreased depth of the ring 20 at the central ported area and the flare of the wall structure defining the inner ends of the openings 22.

While in the illustrated embodiment of the invention I have shown the oil ring 20 with a V-shaped recess defined by the converging conical seats 24 and 26, I wish to include as part of this invention other obvious forms of construction capable of functioning equally as well to urge the expander spring by its own expanding action to a definite seat or position with reference to the outer ring and/or the ring groove. In this respect the invention includes the employment of one or more surfaces inclined to the radial expanding action of the expander spring for definitely positioning the same. Moreover, the invention is not limited to oil rings as it is of equal importance in a compression ring that the expander spring act uniformly.

Having described my invention what I desire to protect by Letters Patent and claim is:

An oil ring and expander assembly of a design to be used for the removal of oil from the cylinder walls and to drain the same through ports in the oil ring groove of the piston for return to the sump through the interior of the piston comprising an oil ring to be located in a ported groove of a piston having circumferentially spaced radially extending ports centrally positioned therein, the inner surface of said oil ring being sloped inwardly in opposite directions to form a substantially V-shaped groove into which said radially extending ports open to provide a flaring discharge at the inner ends of said ports, an expander spring of less width than said oil ring and adapted to engage with the sloping sides of said V-groove at points spaced above and below said radially extending ports when said ring and expander are positioned in an assembled relation in a ported piston ring groove, said spring being of angular configuration so as to engage with said V-groove only at circumferentially spaced points, the expanding action of said spring in said V-groove resulting in said spring centering itself when in use spaced from the bottom and top of the ring groove to permit oil to flow between said ports in the piston and the ports in said ring and around the spring without obstruction as well as providing circumferential oil passages above and below said spring, the axial dimension of said radially extending ports being substantially one-third the axial width of said oil ring, the solid portions of said oil ring disposed between said ports and said ring being sufficiently close together as to restrain any axial deflection of portions of said oil ring under the action of said spring.

FREDRICK A. LUTHY.